US007933877B2

(12) United States Patent
Mount et al.

(10) Patent No.: US 7,933,877 B2
(45) Date of Patent: Apr. 26, 2011

(54) MULTI-PASS DATA ORGANIZATION AND AUTOMATIC NAMING

(75) Inventors: John A. Mount, San Francisco, CA (US); Badrul M. Sarwar, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 12/771,958

(22) Filed: Apr. 30, 2010

(65) Prior Publication Data

US 2010/0223289 A1  Sep. 2, 2010

Related U.S. Application Data

(63) Continuation of application No. 11/646,905, filed on Dec. 28, 2006, now Pat. No. 7,739,247.

(51) Int. Cl.
G06F 7/00 (2006.01)
G06F 17/00 (2006.01)
(52) U.S. Cl. ........ 707/688; 707/736; 707/769; 707/770; 709/217; 709/218; 709/219
(58) Field of Classification Search .................. 707/688, 707/736, 769, 770; 709/217, 218, 219
See application file for complete search history.

(56) References Cited

U.S. PATENT DOCUMENTS

| 5,634,051 | A | | 5/1997 | Thomson | |
|---|---|---|---|---|---|
| 5,832,182 | A | * | 11/1998 | Zhang et al. | 706/50 |
| 5,924,090 | A | | 7/1999 | Krellenstein | |
| 5,963,659 | A | * | 10/1999 | Cahill et al. | 707/E17.009 |
| 5,963,965 | A | | 10/1999 | Vogel | |
| 5,966,126 | A | | 10/1999 | Szabo | |
| 6,018,738 | A | * | 1/2000 | Breese et al. | 707/749 |
| 6,092,072 | A | | 7/2000 | Guha et al. | |
| 6,393,426 | B1 | | 5/2002 | Odom et al. | |
| 6,742,003 | B2 | * | 5/2004 | Heckerman et al. | 707/999.104 |
| 7,080,063 | B2 | | 7/2006 | Campos et al. | |
| 7,181,438 | B1 | | 2/2007 | Szabo | |
| 7,269,517 | B2 | * | 9/2007 | Bondarenko | 702/19 |
| 7,739,247 | B2 | | 6/2010 | Mount et al. | |
| 2002/0042793 | A1 | * | 4/2002 | Choi | 707/6 |

(Continued)

OTHER PUBLICATIONS

Vladimir Estivill-Castro—"Private Represntative-Based Clustering for Vertically Partitioned Data—" Computer Science, 2004, ENC 2004, Proceedings of the fifth Maxican International Conference, Sep. 20-24, 2004, (pp. 160-167).*

(Continued)

Primary Examiner — Jean B. Fleurantin
Assistant Examiner — Anh Ly
(74) Attorney, Agent, or Firm — Schwegman, Lundberg & Woessner, P.A.

(57) ABSTRACT

A method and a system to organize a data set into groups of data subsets in multiple passes using different parameters and to automatically name the groups is disclosed. For example, a data set is retrieved in accordance with a search query submitted by a user. The data set is organized into clusters based on a statistic(s) of the data set. The data set is then organized into groups of data subsets based on an attribute(s) indicated by the data set. Each of the groups are automatically named based on a property shared by data units of the group. The name(s) of a group may be mined from the data units of the group, retrieved from a structure that maps to attribute values indicated by the data units of the group, etc.

17 Claims, 10 Drawing Sheets

U.S. PATENT DOCUMENTS

| | | | |
|---|---|---|---|
| 2002/0052882 A1* | 5/2002 | Taylor | 707/104.1 |
| 2003/0018652 A1 | 1/2003 | Heckerman et al. | |
| 2003/0037041 A1* | 2/2003 | Hertz | 707/1 |
| 2003/0212520 A1 | 11/2003 | Campos et al. | |
| 2003/0212692 A1 | 11/2003 | Campos et al. | |
| 2003/0212693 A1 | 11/2003 | Campos et al. | |
| 2003/0212702 A1 | 11/2003 | Campos et al. | |
| 2003/0212713 A1* | 11/2003 | Campos et al. | 707/200 |
| 2004/0010497 A1* | 1/2004 | Bradley et al. | 707/100 |
| 2004/0181554 A1 | 9/2004 | Heckerman et al. | |
| 2005/0234972 A1* | 10/2005 | Zeng et al. | 707/103 R |
| 2006/0047640 A1* | 3/2006 | Ono et al. | 707/3 |
| 2007/0156677 A1* | 7/2007 | Szabo | 707/5 |
| 2008/0162533 A1 | 7/2008 | Mount et al. | |

OTHER PUBLICATIONS

Tae W. Ryu and Christoph F. Erick—"A Systematic Database Summary Generation Using the Distributed Query Discovery System"—Computational Science and Its Applications—ICCSA 2004, vol. 3046/2004, (pp. 185-195).*

Glenn W. Milligan= "A Monte Carlo Study of Thirty Internal Criterion Measures for Cluster Analysis"—PSYCHOMETRIKA, vol. 46, No. 2 (pp. 187-199).*

"U.S. Appl. No. 11/646,905, Final Office Action mailed May 29, 2009", 22 pgs.

"U.S. Appl. No. 11/646,905, Non-Final office Action mailed Nov. 14, 2008", 23 pgs.

"Application Serial No. 11/646,905, Notice of Allowance mailed Jan. 28, 2010", 16 pgs.

"U.S. Appl. No. 11/646,905, Pre-Appeal Brief Request filed Nov. 30, 2009", 5 pgs.

"U.S. Appl. No. 11/646,905, Response filed Feb. 17, 2009 to Non Final Office Action mailed Nov. 14, 2008", 22 pgs.

Dimitrova, N., et al., "Multimedia Content Analysis and Indexing for Filtering and Retrieval Applications", J. Informing Science, Special Issue on Multimedia Informing Technologies-Part 1, vol. 2, No. 4, (1999), 1-14.

Kannan, R., et al., "On clusterings-good, bad and spectral", 41st Annual Symposium on Foundations of Computer Science, 2000. Proceedings., (2000), 367-377.

Takizawa, Hiroyuki, et al., "Hierarchical parallel processing of large scale data clustering on a PC cluster with GPU co-processing", The Journal of Supercomputing, 36(3), (Jun. 2006), 219-234.

* cited by examiner

| Attribute based indices 501 | Conditionals 503 | Names 505 |
|---|---|---|
| <Index1> | <Conditional1> | <Name1> |
| | | <Name2> |
| <Index2> | <Conditional2> | <Name3> |
| | | <Name4> |
| . . | | |
| <IndexN> | <ConditionalN> | <Name2N-1> |
| | | <Name2N> |

Name Structure
500

Fig. 5

MULTI-PASS DATA ORGANIZATION AND AUTOMATIC NAMING

This application is a continuation of U.S. application Ser. No. 11/646,905, filed Dec. 28, 2006 now U.S. Pat. No. 7,739, 247, entitled "Multi-Pass Data Organization and Automatic Naming," which is incorporated herein by reference in its entirety.

TECHNICAL FIELD

The present application relates generally to the technical field of statistical data analysis and, in one specific example, to organizing data into groups with multiple passes of different organization techniques, and automatically naming the groups.

BACKGROUND

When searching for products or services online, a user is often presented with a large number of results. In an attempt to avoid overwhelming a user, data is generally organized in a manner that, hopefully, enhances the user experience. For example, the data is generally organized in manner that allows a user to quickly glean useful information from the presented search-query results.

Some example challenges that may exist with current techniques include the presentation of data in a meaningful manner and the expense of preparing data for the presentation. For example, data may be presented based on statistics that are user driven. However, presenting data solely based on user driven statistics may not be meaningful since user behavior is not constrained by a particular attribute of the product or service of interest. For instance, a user searching for a book about automotive repair may be presented with recommended books about cooking. Although user statistics may indicate that users often purchase these two types of books, there is no objective attribute-based reason for recommending a cooking book to a user looking at an automotive book. It may be that many user accounts are shared by married couples with diverse interests. However, such an underlying cause for data association is imperceptible to the user. To address this possible challenge, the book data may be tagged. However, determining tags and then tagging a vast database of data may require expenditure of significant resources.

BRIEF DESCRIPTION OF THE DRAWINGS

Some embodiments are illustrated by way of example and not limitation in the figures of the accompanying drawings in which:

FIG. 5 is a conceptual depiction of an example of a name structure.

DETAILED DESCRIPTION

Figure 1:
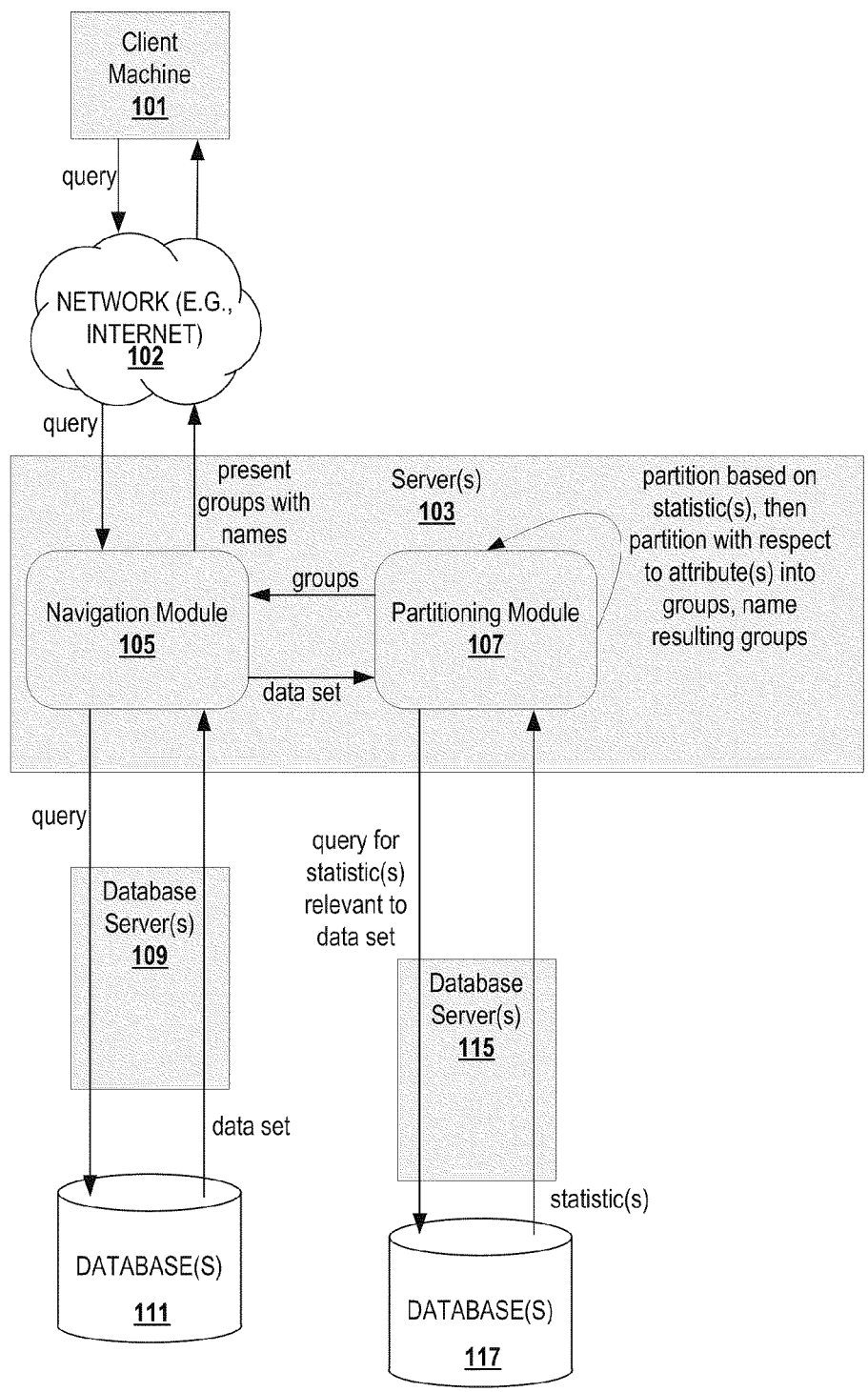
FIG. 1 is a graphical depiction of an example of a system that presents a data set in accordance with multi-pass organizing.

Example methods and systems to organize a data set into groups with multiple passes based on different parameters and to automatically name each of the groups are described. In the following description, for purposes of explanation, numerous specific details are set forth in order to provide a thorough understanding of example embodiments. It will be evident, however, to one skilled in the art that the present invention may be practiced without these specific details. For instance, examples are described with reference to clustering techniques, but details of clustering techniques are not exhaustively described, particularly in light of the plethora of clustering techniques that can be utilized within different classes of clustering, such as hierarchical clustering and partitional clustering. In another instance, details of organizing are not exhaustively described since one of ordinary skill in the art will appreciate that embodiments may employ any of a number of techniques, such as, but not limited to: writing data units of different groups into different locations in physical or virtual memory; writing data units of different groups into different memory or storage devices, rearranging data units, automatically tagging data units to indicate the organization, updating data with pointers, both writing data to a location and tagging the data, etc.

Automating organization of data allows the expense of manual tagging to be avoided. In one implementation, a data set is organized into groups with two passes using different parameters (e.g., a statistic and an attribute value), and then each group is automatically named. Statistics extrapolated from a data set and/or statistics collected in advance will drive organizing of the data set into data subsets or clusters. The data set is then organized with respect to one or more attributes. Although the second organizing pass is separate from the first organizing pass, the second organizing pass is with respect to the subsets or clusters resulting from the first pass. The second pass may or may not partition data units of one or more clusters created by the first organizing pass. The second organizing pass results in various groups of data units from the data set. Each of the groups is then automatically named.

For example, one may consider the hypothetical example of a data set wherein each data unit in the data set represents a respective type of digital camera. The data units are first organized based on a statistic, such as number of shared attributes. The first organizing pass may create clusters that mostly are divided between the categories of professional cameras and convenience cameras, as an example, based on the statistic(s) of shared attributes. In that example, each data unit indicates weight of the respective type of digital camera associated with the data unit. An example attribute value for the second organizing pass may be a weight of 0.5 pounds. The second organizing pass then distinguishes between those data units that indicate a weight greater than 0.5 pounds and those data units that indicate a weight equal to or less than 0.5 pounds. Indicated weights greater than 0.5 pounds map to a name "heavy" and indicated weights less than or equal to 0.5 pounds map to a name "light." Each group of data units that results from the multiple organizing passes will satisfy the statistical organizing and the structural organizing (or attribute driven organizing) Hence, statistical organizing followed by attribute driven organizing allows for quality clustering of data units that can be presented to a user in a meaningful manner. In this example, the presentation is meaningful to a user since a user can determine that a professional camera is generally "heavy," and inclusion of a convenience camera in the group is due to the convenience camera also being "heavy." Since the drivers of the organizing are based on the data already available or automatically generated, the expense of tagging data can be avoided, although the organizing can be augmented with tagging. This example is provided to depict a particular grouping of data that may seem meaningless or imperceptible without the naming. As another example, data units in a first group named "professional" may be grouped together because the member data units indicate number of pixels that exceed a pre-defined threshold for those types of digital cameras associated with the data units in the first group.

FIG. 1 is a graphical depiction of an example of a system that presents a data set in accordance with multi-pass organizing. A client machine 101 transmits a query to a server 103 via a network 102 (e.g., one or more of the Internet, a LAN, a WAN, etc.). Server 103 is operationally connected to one or more database servers 109 and 115. In one implementation, the server 103 includes the navigation module 105. The navigation module 105 handles the query from the client machine 101 and sends the query to the database server 109. The navigation module 105 allows a user to search, navigate, and/or browse data. The database server 109 accesses the database 111 to retrieve a data set in accordance with the query. The database server 109 sends the data set retrieved from the database 111 to the navigation module 105. The navigation module 105 sends the data set to a organizing module 107. The organizing module 107 queries a database server 115 for statistic(s) relevant to the data set. Although the database servers 115 and 109, as well as the databases 111 and 117, are depicted as separate, the servers 109 and 115 and/or the databases 111 and 117 may not be separate. The database server 115 accesses a database 117 and retrieves the statistic. The database server 115 sends the retrieved statistic(s) to the organizing module 107. The organizing module 107 organizes the data set based on the statistic(s) into clusters or data subsets. The organizing module 107 then organizes the data set based on an attribute(s) of the data set into groups. The organizing module 107 automatically names the resulting groups. The organizing module 107 sends the resulting groups to the navigation module 105. The navigation module 105 presents the groups with names to the client machine 101 via the network 102. Presenting the data set in accordance with the groupings and with the names allows a user at the client machine 101 to perceive the underlying basis for the particular organization of the data set. Of course, it is not necessary to indicate the names to the user. The names may be utilized for a variety of purposes and/or in a variety of ways (e.g., utilized to maintain the data; not revealed to a user unless responsive to a request; present or reveal less than all of the names; etc.).

It should be understood that the system depicted in FIG. 1 is an example. Although depicted as singular, the any one or more of the servers 103, 109 and 115 may be implemented as multiple servers. In addition, the functionality for organizing a data set in multiple passes can be implemented in accordance with a variety of techniques. For instance, the navigation module 105 and the organizing module 107 may be implemented as a single module, such as an information guide (e.g., a web-based guide, an application for mobile devices, etc.). In another example, a separate module or modules may implement the automatic naming functionality and/ or the statistic generation functionality (e.g., statistic extrapolation module). For example, groups resulting from an organized data set may be sent to a module that examines the groups to automatically name the groups, that accesses a structure or database to look up names based on a shared property, etc. Moreover, the modules may be wholly or partially implemented in hardware (e.g., an application specific integrated circuit may perform the organizing functionality, names may be hosted in a fast look-up table, etc.). Furthermore, the modules may implemented across multiple servers.

Figure 2:
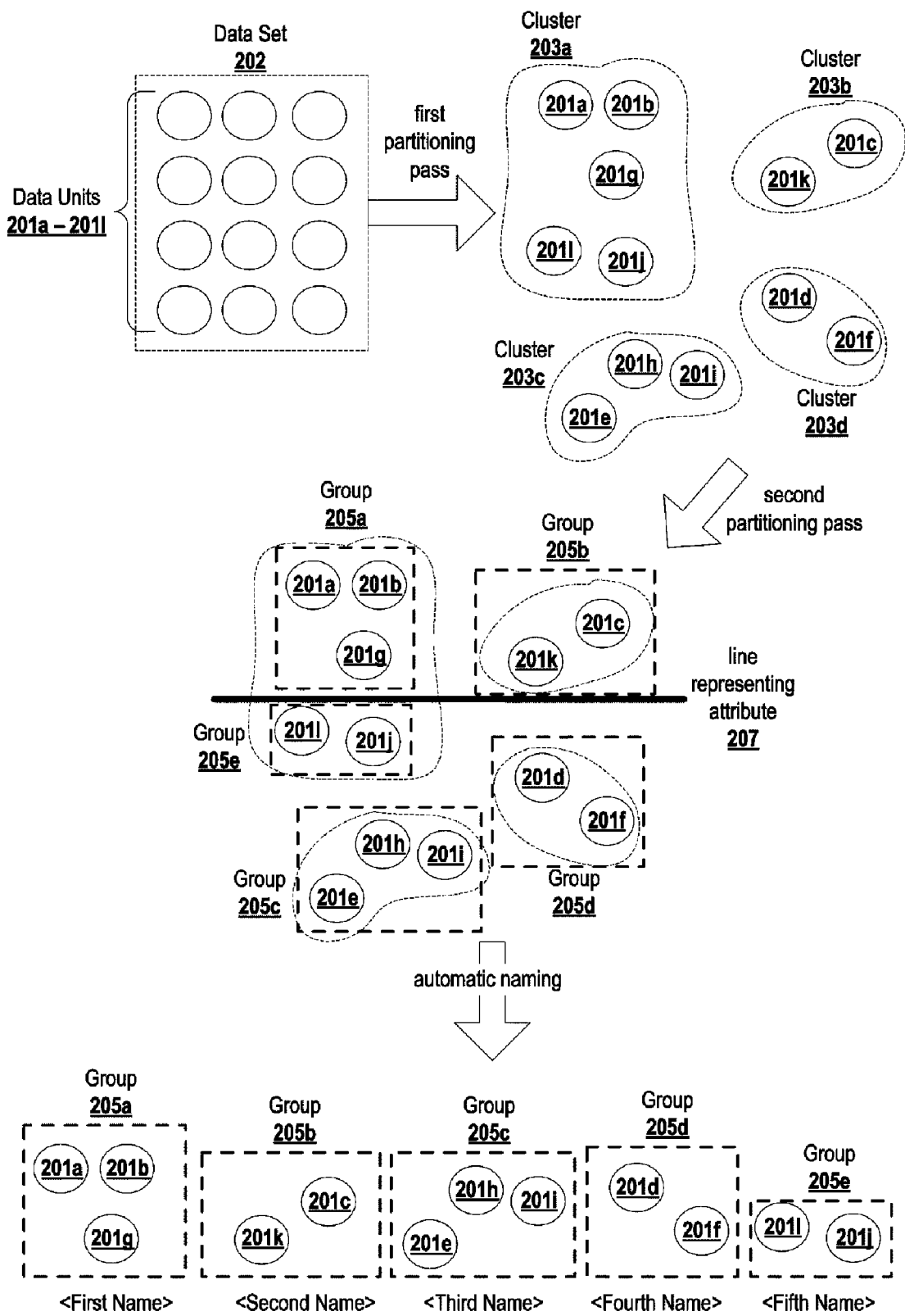
FIG. 2 is a graphical representation of an example of a process for organizing a data set.

FIG. 2 is a graphical representation of an example of a process for organizing a data set. A data set 202 includes data units 201a-201l. The data units 201a-201l represent an item that may be abstract or concrete, such as a product, service, real estate, stock, etc. Each of the data units 201a-201l indicates a value(s) for one or more attributes of the represented item. With a first organizing pass driven by a statistic(s) about the data set 202, the data set 202 is organized into clusters 203a-203d of similar data units. The cluster 203a includes the data units 201a-201b, 201g, 201j, and 201l. The cluster 203b includes the data units 201c and 201k. The cluster 203c includes the data units 201e, 201h, and 201i. The cluster 203d includes the data units 201d and 201f. Similarity can be driven in accordance with a number of techniques (or combination of techniques) such as number of attributes in common, amount of text shared among item descriptions, a taxonomy, statistical co-occurrence of items, behavioral evidence (visitors browsing one item and then another, considered as evidence of similarity), etc. Similarity does not require every data unit in a cluster to have identical or nearly identical values. For example, similarity may depend on the utilized clustering technique(s) (e.g., k-means clustering, fuzzy clustering, agglomerative clustering, etc.).

A second organizing pass driven by one or more attributes organizes the data set 202 into groups 205a-205e. The groups 205b-205d include the same data units as the clusters 203b-203d, respectively. The second organizing pass has partitioned the cluster 203a into groups 205a and 205e. After the second organizing pass, the groups are automatically named. However, it is not necessary to only perform two passes. The groups may be refined, cluster quality improved, etc., with additional passes over the data set before and/or after the first and second organizing passes. For example, a clustering technique may be applied to the groups resulting from the second organizing pass with a different or the same statistic as that employed for the first organizing pass. Alternatively, the data set may be organized again with respect to different attributes.

In addition, several possible cluster-quality metrics are possible. Two particular examples of cluster-quality metrics include the ratio of cross-cluster similarity to global similarity (i.e., items from different clusters are less similar than items from the same cluster in general) and spectral clustering. In addition to cluster quality, the quality of both the description and the name of an item can also be measured. Moreover, the description and name can be used as a criteria or part of the criteria for determining which of the results of clustering to accept.

Figure 3:
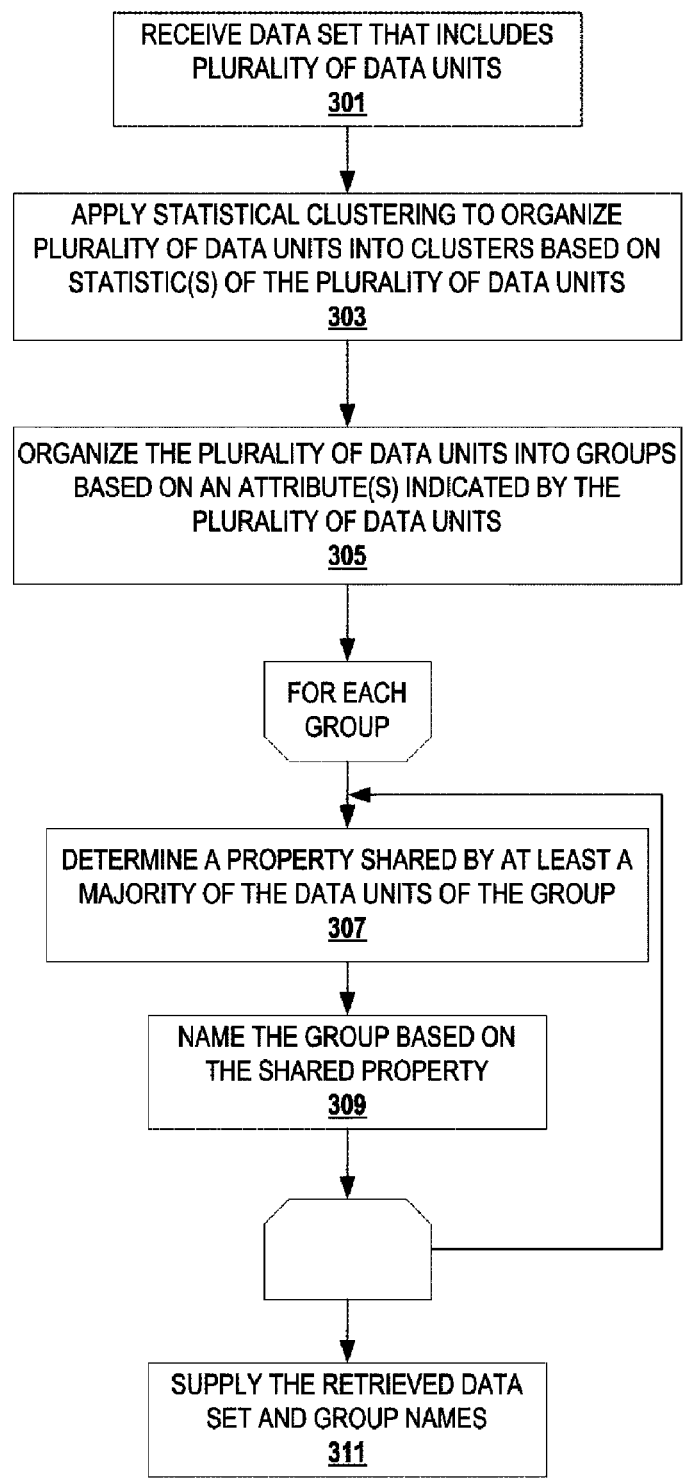
FIG. 3 is a flowchart that depicts an example of a process for automatically organizing a data set into groups and automatically naming the groups.

FIG. 3 is a flowchart that depicts an example of a process for automatically organizing a data set into groups and automatically naming the groups. At block 301, a data set that includes a plurality of data units is received. At block 303, statistical clustering is applied to the data set to organize the plurality of data units into clusters based on one or more statistic of the plurality of data units. Virtually any statistic associated with the various data units may be used, including, for example, user selection or purchasing behavior, attributes shared among the plurality of data units, textual data shared among the data units, etc. A clustering technique may search over all possible small decision trees or short formulas to find a clustering that has high quality, a good name, and a good cluster description. The cluster description is essentially a query that reproduces the cluster (from the set of data units under consideration). For example, a cluster description for digital cameras may be a search-query like "SLRs costing more than $2000."

At block 305, the plurality of data units is organized into groups based on one or more attributes indicated by the plurality of data units. Attributes can vary greatly in relation to the item being represented by the data units. For example, the data units may represent digital cameras. Examples of digital camera attributes include number of pixels, screen size, zoom, weight, price range, price, power source, etc. Examples of attributes for land items include acreage, lot size, terrain, available water source, rural or urban, improved, available utilities, etc. Examples of attributes for service items include level of experience, schedule availability, recommendation, geographic proximity, certifications, etc. One of ordinary skill in the art should appreciate the broad spectrum of items that can be represented and wide array of corresponding attributes that can be utilized for organizing.

After block 305, blocks 307 and 309 are performed for each group of data units resulting from the second organizing pass. For example, a shared property is based on an attribute. Attribute values may be mapped to a name (e.g., phrase or label associated with an attribute value) in various implementations. In one example, an implementation may allow multiple names per attribute value and the same names may be used by different attributes and different attribute values. For example, the name "heavy" may be mapped to attribute values greater than or equal to 12 ounces, while the name "light" is mapped to attribute values below 12 ounces. In addition, the name "professional" may be mapped to weight values that are greater than 1 pound and mapped to pixel values that are greater than 5 mega-pixels.

At block 307, a property (or properties) that is shared by at least a majority of the data units of the group is determined. At block 309, the group is named based on the determined shared property. The group name is chosen to be succinct, but not necessarily accurate. For one example, it may be determined that at least a majority of data units of a group includes the term "farm," thus the group is named "farm." However, at least one of the data units indicates a hobby farm while the majority of data units indicate industrial farm. In another example, data units of a data set may represent computers and the data units of a particular group indicate video cards with at least 1 gigabyte of memory and cooling systems. The group is named "gaming computers," because such attributes are often associated with computers configured to support demands of computer games. After the groups are named, the data set and the names are supplied at block 311 (e.g., supplied for transmission, supplied for assembly into a web page, supplied for display, etc.). In one example, naming finds an assignment of groups to names such that for each group, most of the represented items have an attribute value that maps to the assigned name and most items not in the given group do not have an attribute value that maps to the name. Hence, in one example, a group of data units is presented to a user by assigned name, followed by the description. Using the previous example, a group may be presented with the name "professional" followed by the description' "SLRs costing more than $2000." Note that "professional" by itself may not be useful to the user (it finds the group through the mapping of the attribute-value to the name), but shown together with the description it looks as if "SLRs costing more than $2000" is an operational definition of "professional." It also appears that "professional" is a convenient shorthand for "SLRs costing more than $2000." The name and the description both are individually incomplete, yet informative when presented together.

Figure 4:
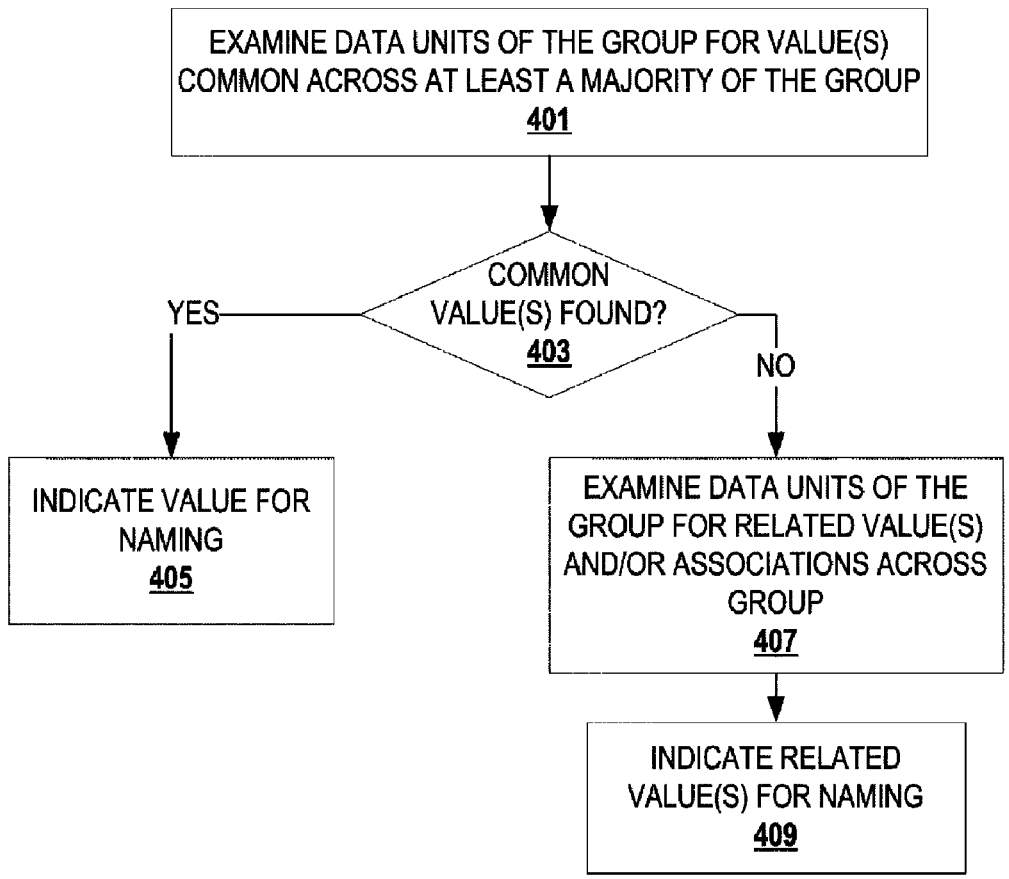
FIG. 4 is a flowchart that depicts an example of a process for determining a shared property.

FIG. 4 is a flowchart that depicts an example of a process for determining a shared property. At block 401, data units of a group are mined for one or more values common across a group. The common values may be text, a symbol, a metric for an attribute, etc. For example, each data unit may include a title field for a represented item. In this example, the title field of each data unit is scanned for a token (e.g., word, image, identifier, character, hyperlink, etc.) that occurs in all of the data units of a group. At block 403, it is determined whether a common value is found. If a common value is found, then control flows to block 405. If a common value is not found, then control flows to block 407.

At block 405, the common value is indicated for naming.

At block 407, the data units are examined for related values and/or associations across the group. For instance, identical terms may not be found in every title field, but related terms are found. For example, some data units of a group include "premium audio system" in a field while other data units of the group include "premium sound system" in the field. Data units with these different values may still be grouped together by associations, for example, determined by consulting a structure that indicates similar terms, synonyms, etc. At block 409, the related value(s) is indicated for naming. For example, values from the data units are used to access another structure to find a value(s) that associates with all data units, which is then used for naming.

The naming of the groups may be based directly on the determined shared property or based on an association that exists between the shared property or properties and a name. For example, names may be retrieved from a structure that hosts names indexed by an attribute or attribute value.

FIG. 5 is a conceptual depiction of an example of a name structure. In FIG. 5, a name structure 500 is represented with three columns. A first column 501 indicates attribute based indices of the name structure (e.g., hashes of attribute labels, hashes of attribute tokens, attribute label, land area, class of professional that provides a service, level of difficulty, etc.). A second column 503 indicates conditionals for each entry. A third column 505 indicates two names for each entry.

Figure 6:
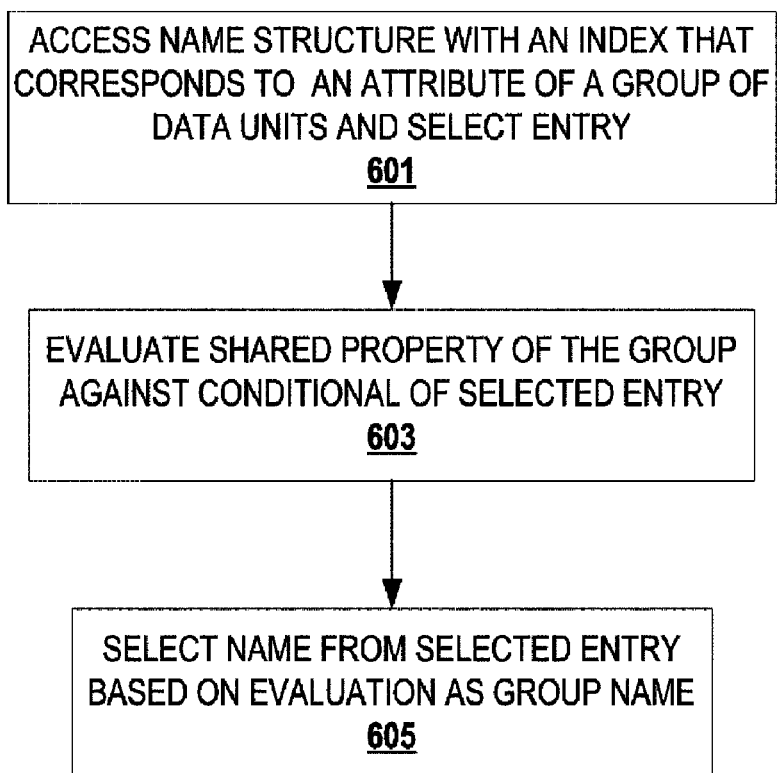
FIG. 6 is a flowchart that depicts an example process for retrieving a name from a name structure.

FIG. 6 is a flowchart that depicts an example process for retrieving a name from a name structure. At block 601, a name structure is accessed with an index that corresponds to an attribute of a group of data units and an entry is selected. For example, the attribute is "printed" for a group of data units that represent various shirts. At block 603, a property shared by the data units of the group is evaluated against a conditional of the selected entry. For example, the index references a piece of code with a conditional statement that branches to one of two pointers to access the corresponding memory location that hosts a name. For instance, the data units of the group indicate that the represented shirts are printed shirts, and the conditional statement determines if the "printed" field of each data unit (or an associated field or subfield) indicates a particular shared property of the printed attribute. For example, data units may be evaluated to determine whether the shirts are printed with a comic book character. At block 605, a name is retrieved from the selected entry based on the evaluated conditional. Referring again to the example of represented printed shirts, if the group of data units indicates that the shirts are printed with a comic book character, then a name is retrieved accordingly. Those of ordinary skill in the art should appreciate that names, values, etc. may be stored in any of a variety of data structures (e.g., arrays, binary search trees, hash tables, linked lists, hybrid data structures, etc.) and/or in any of a variety of hardware (e.g., cache, storage, random access memory, portable flash memory, lookup tables, content addressable memory, etc.).

Figure 7:
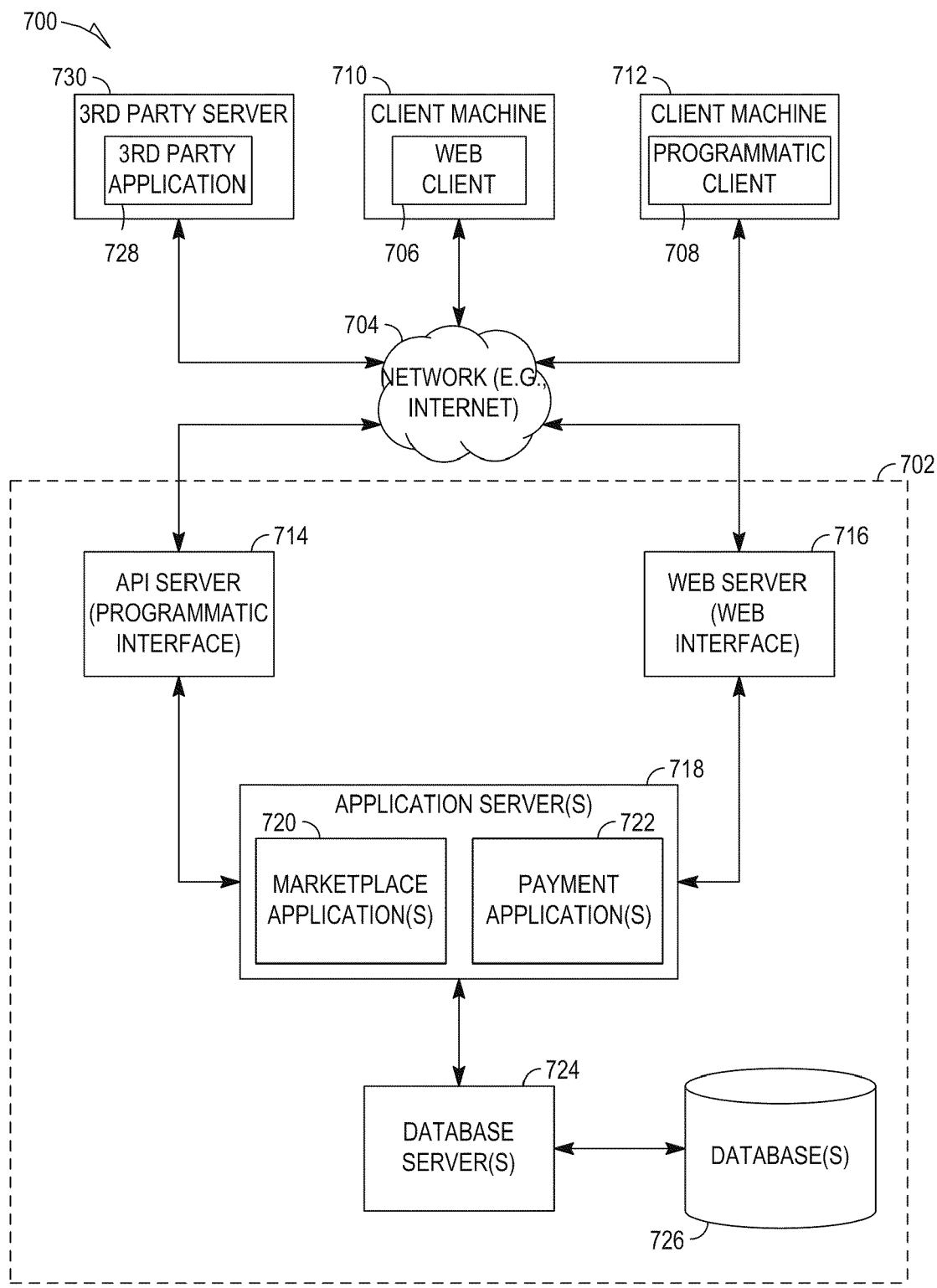
FIG. 7 is a network diagram depicting a client-server system 700, within which one example embodiment may be deployed.

FIG. 7 is a network diagram depicting a client-server system 700, within which one example embodiment may be deployed. A networked system 702, in the example forms of a network-based marketplace or publication system, provides server-side functionality, via a network 704 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Wash.), and a programmatic client 708 executing on respective client machines 710 and 712.

An Application Program Interface (API) server 714 and a web server 716 are coupled to, and provide programmatic and web interfaces respectively to, one or more application servers 718. The application servers 718 host one or more marketplace applications 720 and payment applications 722. The application servers 718 are, in turn, shown to be coupled to one or more databases servers 724 that facilitate access to one or more databases 726.

The marketplace applications 720 may provide a number of marketplace functions and services to users that access the networked system 702. The payment applications 722 may likewise provide a number of payment services and functions to users. The payment applications 722 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 720. While the marketplace and payment applications 720 and 722 are shown in FIG. 7 to both form part of the networked system 702, it will be appreciated that, in alternative embodiments, the payment applications 722 may form part of a payment service that is separate and distinct from the networked system 702.

Further, while the system 700 shown in FIG. 7 employs a client-server architecture, the present invention is of course not limited to such an architecture, and could equally well find application in a distributed, or peer-to-peer, architecture system, for example. The various marketplace and payment applications 720 and 722 could also be implemented as standalone software programs, which do not necessarily have networking capabilities.

The web client 706 accesses the various marketplace and payment applications 720 and 722 via the web interface supported by the web server 716. Similarly, the programmatic client 708 accesses the various services and functions provided by the marketplace and payment applications 720 and 722 via the programmatic interface provided by the API server 714. The programmatic client 708 may, for example, be a seller application (e.g., the TurboLister application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party website may, for example, provide one or more promotional, marketplace or payment functions that are supported by the relevant applications of the networked system 702.

Marketplace Applications

Figure 8:
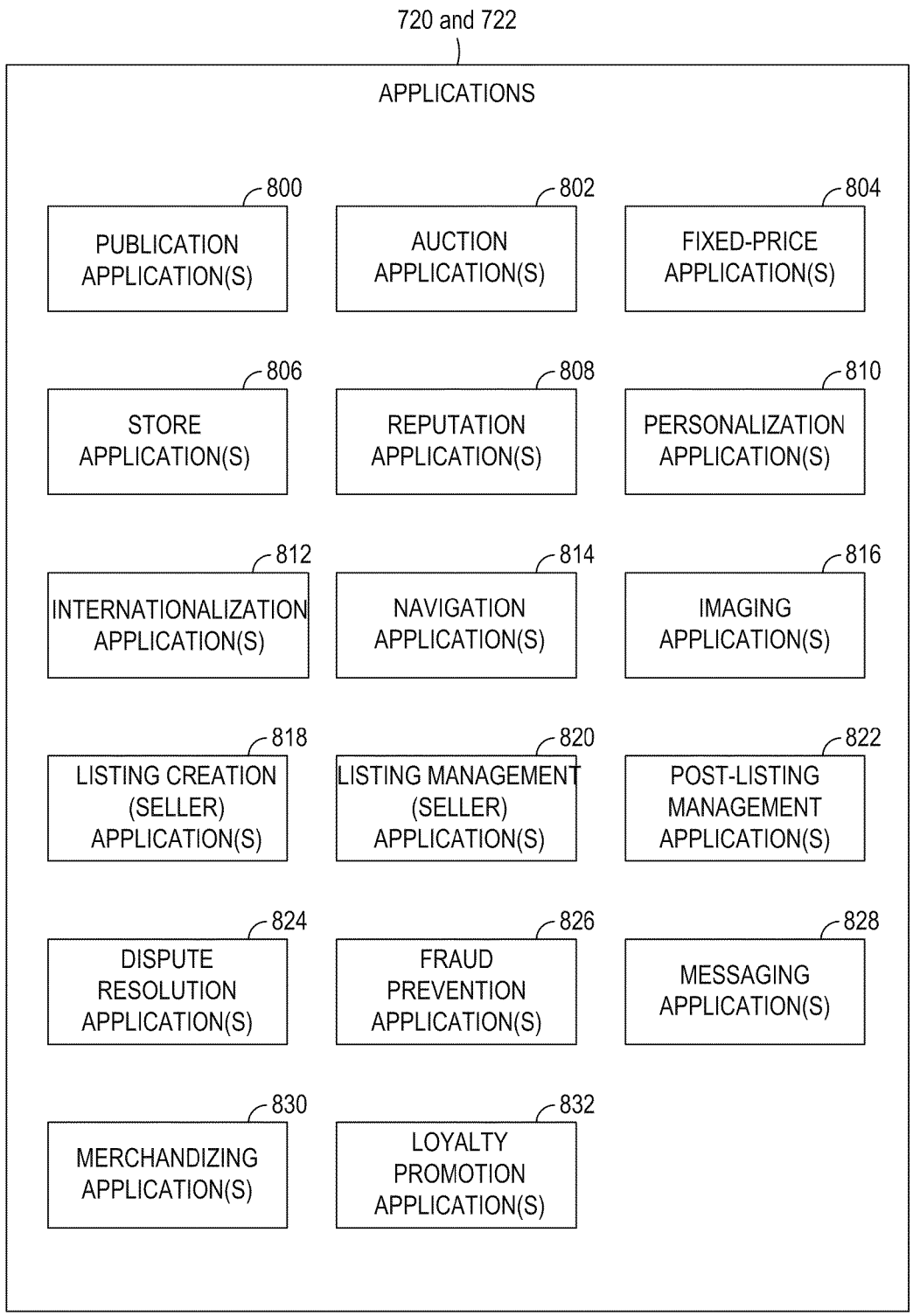
FIG. 8 is a block diagram illustrating multiple applications 720 and 722 that, in one example embodiment, are provided as part of the networked system 702.

FIG. 8 is a block diagram illustrating multiple applications 720 and 722 that, in one example embodiment, are provided as part of the networked system 702. The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 726 via the database servers 728.

The networked system 702 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 720 are shown to include at least one publication application 800 and one or more auction applications 802 which support auction-format listing and price setting mechanisms (e.g., English, Dutch, Vickrey, Chinese, Double, Reverse auctions etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 806 allow a seller to group listings within a "virtual" store, which may be branded and otherwise personalized by and for the seller. Such a virtual store may also offer promotions, incentives and features that are specific and personalized to a relevant seller.

Reputation applications 808 allow users that transact, utilizing the networked system 702, to establish, build and maintain reputations, which may be made available and published to potential trading partners. Consider that where, for example, the networked system 702 supports person-to-person trading, users may otherwise have no history or other reference information whereby the trustworthiness and credibility of potential trading partners may be assessed. The reputation applications 808 allow a user, for example through feedback provided by other transaction partners, to establish a reputation within the networked system 702 over time. Other potential trading partners may then reference such a reputation for the purposes of assessing credibility and trustworthiness.

Personalization applications 810 allow users of the networked system 702 to personalize various aspects of their interactions with the networked system 702. For example a user may, utilizing an appropriate personalization application 810, create a personalized reference page at which information regarding transactions to which the user is (or has been) a party may be viewed. Further, a personalization application 810 may enable a user to personalize listings and other aspects of their interactions with the networked system 702 and other parties.

The networked system 702 may support a number of marketplaces that are customized, for example, for specific geographic regions. A version of the networked system 702 may be customized for the United Kingdom, whereas another version of the networked system 702 may be customized for the United States. Each of these versions may operate as an independent marketplace, or may be customized (or internationalized) presentations of a common underlying marketplace. The networked system 702 may accordingly include a number of internationalization applications 812 that customize information (and/or the presentation of information) by the networked system 702 according to predetermined criteria (e.g., geographic, demographic or marketplace criteria). For example, the internationalization applications 812 may be used to support the customization of information for a number of regional websites that are operated by the networked system 702 and that are accessible via respective web servers 716.

Navigation of the networked system 702 may be facilitated by one or more navigation applications 814. For example, a search application (as an example of a navigation application) may enable key word searches of listings published via the networked system 702. A browse application may allow users to browse various category, catalogue, or inventory data structures according to which listings may be classified within the networked system 702. Various other navigation applications may be provided to supplement the search and browsing applications.

In order to make listings, available via the networked system 702, as visually informing and attractive as possible, the marketplace applications 720 may include one or more imaging applications 816 utilizing which users may upload images for inclusion within listings. An imaging application 816 also operates to incorporate images within viewed listings. The imaging applications 816 may also support one or more promotional features, such as image galleries that are presented to potential buyers. For example, sellers may pay an additional fee to have an image included within a gallery of images for promoted items.

Listing creation applications 818 allow sellers conveniently to author listings pertaining to goods or services that they wish to transact via the networked system 702, and listing management applications 820 allow sellers to manage such listings. Specifically, where a particular seller has authored and/or published a large number of listings, the management of such listings may present a challenge. The listing management applications 820 provide a number of features (e.g., auto-relisting, inventory level monitors, etc.) to assist the seller in managing such listings. One or more post-listing management applications 822 also assist sellers with a number of activities that typically occur post-listing. For example, upon completion of an auction facilitated by one or more auction applications 802, a seller may wish to leave feedback regarding a particular buyer. To this end, a post-listing management application 822 may provide an interface to one or more reputation applications 808, so as to allow the seller conveniently to provide feedback regarding multiple buyers to the reputation applications 808.

Dispute resolution applications 824 provide mechanisms whereby disputes arising between transacting parties may be resolved. For example, the dispute resolution applications 824 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 826 implement fraud detection and prevention mechanisms to reduce the occurrence of fraud within the networked system 702.

Messaging applications 828 are responsible for the generation and delivery of messages to users of the networked system 702, such messages for example advising users regarding the status of listings at the networked system 702 (e.g., providing "outbid" notices to bidders during an auction process or to provide promotional and merchandising information to users). Respective messaging applications 828 may utilize any one have a number of message delivery networks and platforms to deliver messages to users. For example, messaging applications 828 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 830 support various merchandising functions that are made available to sellers to enable sellers to increase sales via the networked system 702. The merchandising applications 80 also operate the various merchandising features that may be invoked by sellers, and may monitor and track the success of merchandising strategies employed by sellers.

The networked system 702 itself, or one or more parties that transact via the networked system 702, may operate loyalty programs that are supported by one or more loyalty/promotions applications 832. For example, a buyer may earn loyalty or promotions points for each transaction established and/or concluded with a particular seller, and be offered a reward for which accumulated loyalty points can be redeemed.

Data Structures

Figure 9:
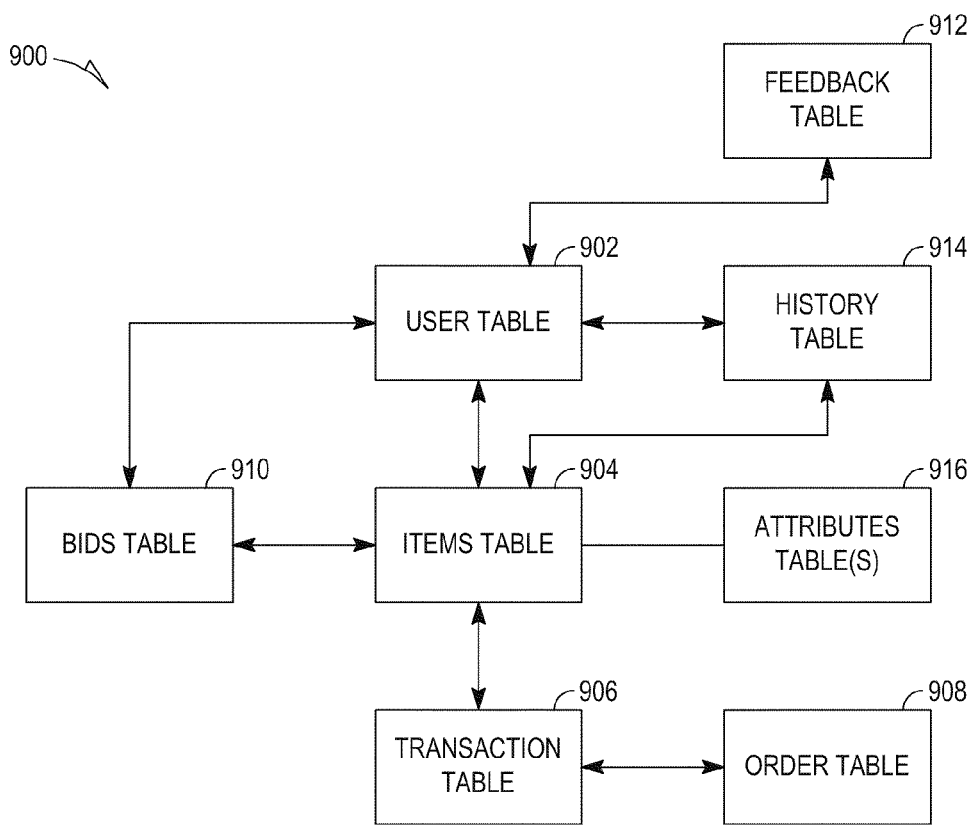
FIG. 9 is a high-level entity-relationship diagram, illustrating various tables 900 that may be maintained within the databases 726, and that are utilized by and support the applications 720 and 722.

FIG. 9 is a high-level entity-relationship diagram, illustrating various tables 900 that may be maintained within the databases 726, and that are utilized by and support the applications 720 and 722. A user table 902 contains a record for each registered user of the networked system 702, and may include identifier, address and financial instrument information pertaining to each such registered user. A user may operate as a seller, a buyer, or both, within the networked system 702. In one example embodiment, a buyer may be a user that has accumulated value (e.g., commercial or proprietary currency), and is accordingly able to exchange the accumulated value for items that are offered for sale by the networked system 702.

The tables 900 also include an items table 904 in which are maintained item records for goods and services that are available to be, or have been, transacted via the networked system 702. Each item record within the items table 904 may furthermore be linked to one or more user records within the user table 902, so as to associate a seller and one or more actual or potential buyers with each item record.

A transaction table 906 contains a record for each transaction (e.g., a purchase or sale transaction) pertaining to items for which records exist within the items table 904.

An order table 908 is populated with order records, each order record being associated with an order. Each order, in turn, may be with respect to one or more transactions for which records exist within the transaction table 906.

Bid records within a bids table 910 each relate to a bid received at the networked system 702 in connection with an auction-format listing supported by an auction application 802. A feedback table 912 is utilized by one or more reputation applications 808, in one example embodiment, to construct and maintain reputation information concerning users. A history table 914 maintains a history of transactions to which a user has been a party. One or more attributes tables 916 record attribute information pertaining to items for which records exist within the items table 904. Considering only a single example of such an attribute, the attributes tables 916 may indicate a currency attribute associated with a particular item, the currency attribute identifying the currency of a price for the relevant item as specified in by a seller.

Figure 10:
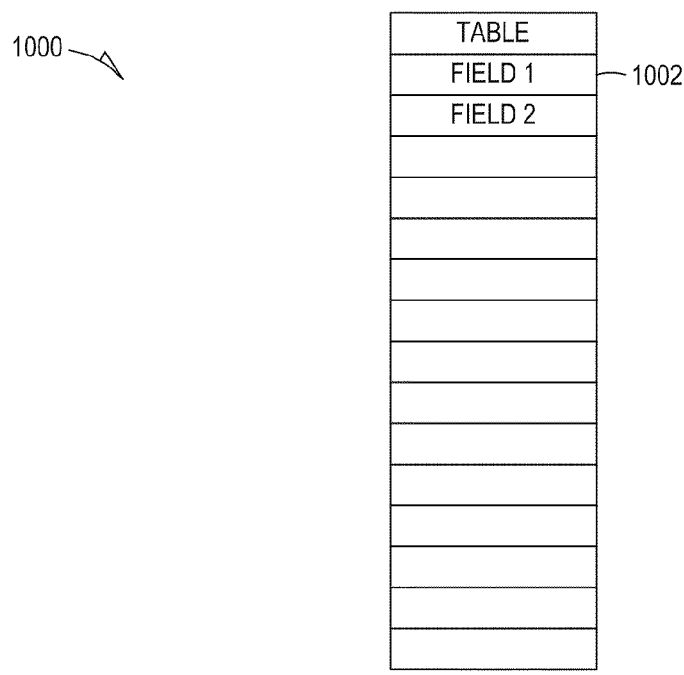
FIG. 10 provides further details regarding an attribute tables that are shown in FIG. 9 to be maintained within the databases 726.

FIG. 10 provides further details regarding an attribute tables that are shown in FIG. 9 to be maintained within the databases 726. A field 1002 indicates a value for an attribute.

Figure 11:
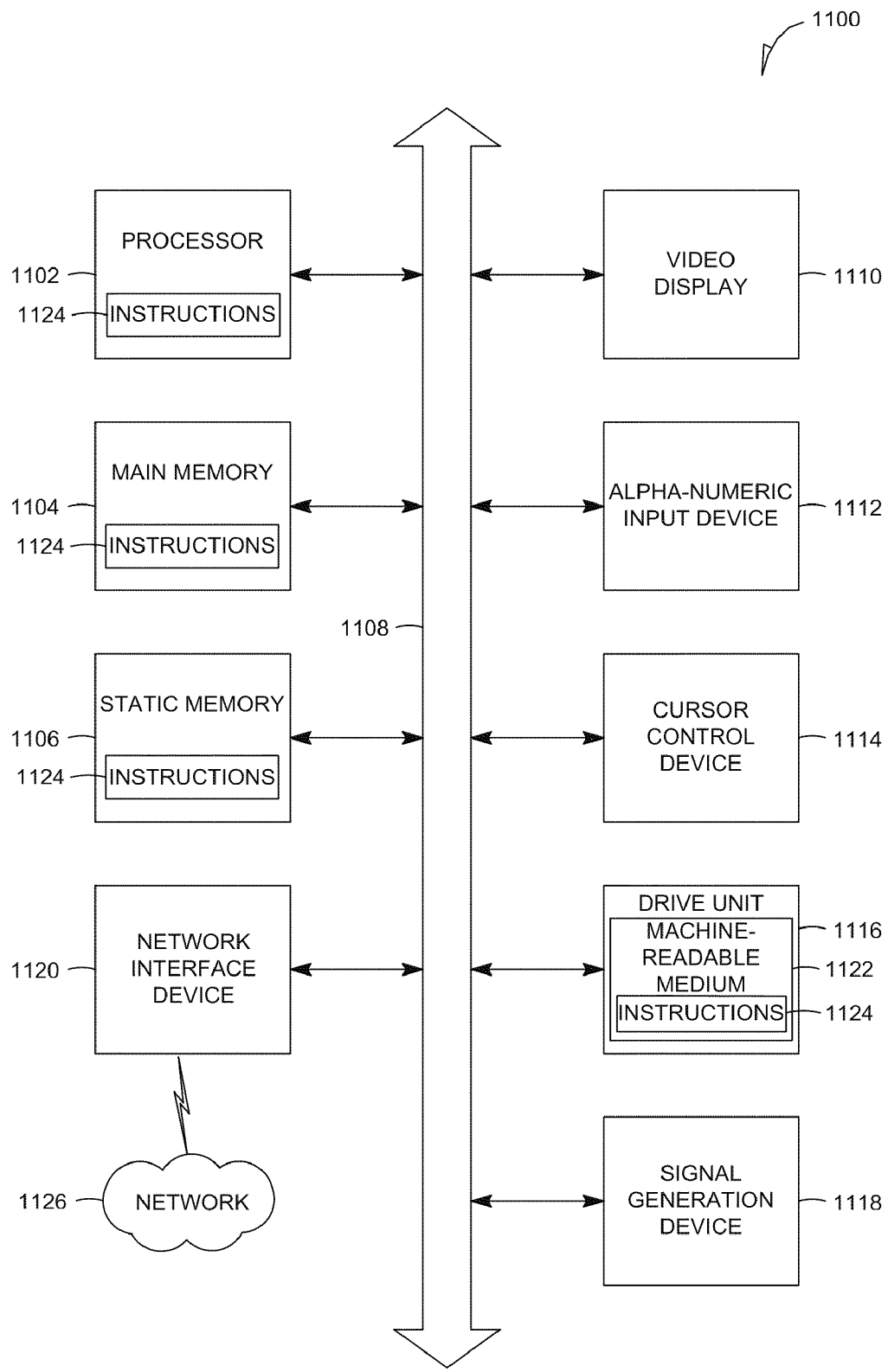
FIG. 11 shows a diagrammatic representation of machine in the example form of a computer system 1100 within which a set of instructions, for causing the machine to perform any one or more of the methodologies discussed herein, may be executed.

FIG. 11 shows a diagrammatic representation of machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU) a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to organize a data set in groups with multiple passes of different organizing techniques and to automatically name the groups have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving a query from a client machine;
   retrieving a data set based on the query.
   the data set including a plurality of data units;
   a data unit of the plurality of data units being representative of an item,
   the data unit includes a value of an attribute of the item represented by the data unit;
   performing a first operation that organizes the data set into a first plurality of clusters;
   performing a second operation that partitions the first plurality of clusters into a second plurality of clusters and a third plurality of clusters, the second plurality of clusters being characterized by an attribute common to each cluster of the second plurality of clusters,
   a cluster of the second plurality of clusters including the data unit,
   the attribute common to each cluster of the second plurality of clusters being the attribute of the item, the third plurality of clusters being characterized by absence of the attribute from each cluster of the third plurality of clusters, the second operation being performed using a processor of a server machine communicatively coupled to the client machine and to a database; and storing the second plurality of clusters in the database.

2. The computer-implemented method of claim 1, wherein the first operation includes a statistical analysis of the data set.

3. The computer-implemented method of claim 2, wherein the statistical analysis processes information selected from a group consisting of:
an attribute of an item;
a number of attributes of the item;
a description of the item;
an amount of text in the description of the item;
a taxonomy of the item;
a probability that the item co-occurs with a further item; and
user behavior data.

4. The computer-implemented method of claim 2, wherein the statistical analysis is based on a technique selected from a group consisting of:
k-means clustering;
fuzzy clustering; and
agglomerative clustering.

5. The computer-implemented method of claim 1, wherein:
the first plurality of clusters includes a first cluster; and
the second operation determines that an entirety of the first cluster is to be included in the second plurality of clusters.

6. The computer-implemented method of claim 1, wherein:
the first plurality of clusters includes a first cluster;
the second operation divides the first cluster into first and second portions and determines that the first portion is to be included in the second plurality of clusters; and
the second portion is absent from the second plurality of clusters.

7. The computer-implemented method of claim 1 further comprising
naming a cluster of the second plurality of clusters.

8. The computer-implemented method of claim 7, wherein:
the cluster includes data units, each of the data units representing one of a plurality of items;
the naming is based on a property shared by a majority of the data units included in the cluster; and the method further comprises
determining the property shared by the majority of the data units.

9. The computer-implemented method of claim 8, wherein:
each of the data units includes one of a plurality of values; and
the determining of the property includes identifying a value common to each of the majority of the data units.

10. The computer-implemented method of claim 8, wherein:
each of the data units includes one of a plurality of values;
the determining of the property includes identifying a value related to each of the majority of the data units; and
the identifying of the value includes accessing a data structure that includes at least one of synonyms or similar terms.

11. The method of claim 1, wherein:
the second operation is performed subsequent to the first operation.

12. A system comprising:
a memory to host a data set including plurality of data units;
a navigation module configured to retrieve a plurality of data units responsive to a query received from a client machine;
a data unit of the plurality of data units being representative of an item,
the data unit including a value of an attribute of the item represented by the data unit;
a hardware-implemented organizing module communicatively coupled to the navigation module, the organizing module being configured to:
perform a first operation that organizes the data set into a first plurality of clusters; and
perform a second operation that partitions the first plurality of clusters into a second plurality of clusters and a third plurality of clusters,
the second plurality clusters being characterized by an attribute common to each cluster of the second plurality of clusters,
a cluster of the second plurality of clusters includes the data unit;
the attribute common to each cluster of the second plurality of clusters is the attribute of the item,
the third plurality of clusters being characterized by absence of the attribute from each cluster of the third plurality of clusters; and
a storage module communicatively coupled to the organizing module, the storage module being configured to store the second plurality of clusters in a database.

13. The system of claim 12, wherein:
the first operation includes a statistical analysis of the data set; and
the statistical analysis is based on a technique selected from a group consisting of:
k-means clustering;
fuzzy clustering; and
agglomerative clustering.

14. The system of claim 12, wherein:
the first plurality of clusters includes a first cluster;
the second operation divides the first cluster into first and second portions and determines that the first portion is to be included in the second plurality of clusters; and
the second plurality of clusters does not include the second portion.

15. The system of claim 12 further comprising
a naming module communicatively coupled to the organizing module, the naming module being configured to name a cluster of the second plurality of clusters.

16. A machine-readable storage medium comprising instructions that, when executed by one or more processors of a machine, cause the machine to perform a method comprising:
receiving a query from a client machine;
retrieving a data set based on the query;
the data set including a plurality of data units;
a data unit of the plurality of data units being representative of an item,
the data unit includes a value of an attribute of the item represented by the data unit;
performing a first operation that organizes the data set into a first plurality of clusters;
performing a second operation that partitions the first plurality of clusters into a second plurality of clusters and a third plurality of clusters,
the second plurality of clusters being characterized by an attribute common to each cluster of the second plurality of clusters, a cluster of the second plurality of clusters includes the data unit;

the attribute common to each cluster of the second plurality of clusters is the attribute of the item;

the third plurality clusters being characterized by absence of the attribute from each cluster of the third plurality clusters; and storing the second plurality of clusters in a database.

17. The machine-readable storage medium of claim 16, wherein:

the first plurality of clusters includes a first cluster;

the second operation divides the first cluster into first and second portions and determines that the first portion is to be included in the second plurality of clusters; and the second portion is absent from the second plurality of clusters.

* * * * *

UNITED STATES PATENT AND TRADEMARK OFFICE
CERTIFICATE OF CORRECTION

| | | |
|---|---|---|
| PATENT NO. | : 7,933,877 B2 | Page 1 of 1 |
| APPLICATION NO. | : 12/771958 | |
| DATED | : April 26, 2011 | |
| INVENTOR(S) | : John A. Mount et al. | |

It is certified that error appears in the above-identified patent and that said Letters Patent is hereby corrected as shown below:

On the Title Page

Item (56), under "Other Publications", line 1, delete "Represntative" and insert -- Representative --, therefor.

Item (56), under "Other Publications", line 3, delete "Maxican" and insert -- Mexican --, therefor.

In column 3, line 14, delete "organizing)" and insert -- organizing). --, therefor.

In column 12, line 51, in Claim 1, delete "query." and insert --query, --, therefor.

In column 14, line 2, in Claim 12, after "including" insert -- a --.

In column 14, line 17, in Claim 12, after "plurality" insert -- of --.

In column 15, line 6, in Claim 16, after "plurality" insert -- of --.

In column 15, line 7, in Claim 16, after "plurality" insert -- of --.

Signed and Sealed this
Fourteenth Day of June, 2011

David J. Kappos
*Director of the United States Patent and Trademark Office*